United States Patent
Taaler

(10) Patent No.: US 7,094,990 B2
(45) Date of Patent: Aug. 22, 2006

(54) CONTACT NOZZLE FOR ELECTRIC ARC WELDING

(75) Inventor: Heino Taaler, LaxÅ (SE)

(73) Assignee: ESAB AB, Göteborg (SE)

( * ) Notice: Subject to any disclaimer, the term of this patent is extended or adjusted under 35 U.S.C. 154(b) by 0 days.

(21) Appl. No.: 10/827,502

(22) Filed: Apr. 19, 2004

(65) Prior Publication Data

US 2005/0016977 A1 Jan. 27, 2005

(30) Foreign Application Priority Data

Apr. 17, 2003 (SE) .................................. 0301159

(51) Int. Cl.
 *B23K 9/24* (2006.01)
(52) U.S. Cl. ................................ 219/137.61
(58) Field of Classification Search ................ 219/136, 219/137.61

See application file for complete search history.

(56) References Cited

U.S. PATENT DOCUMENTS

| | | | | |
|---|---|---|---|---|
| 1,644,237 A | * | 10/1927 | Christensen | ................. 219/136 |
| 3,283,121 A | * | 11/1966 | Bernard et al. | ........ 219/137.61 |
| 4,450,341 A | * | 5/1984 | Dietrick et al. | ............. 219/136 |
| 4,575,612 A | | 3/1986 | Prunier | |

FOREIGN PATENT DOCUMENTS

| EP | 1108491 | | 6/2001 |
|---|---|---|---|
| JP | 2002-45969 A | * | 2/2002 |
| JP | 2002-292469 A | * | 10/2002 |

* cited by examiner

*Primary Examiner*—Clifford C. Shaw
(74) *Attorney, Agent, or Firm*—Dilworth & Barrese LLP

(57) ABSTRACT

Contact nozzle 1 for electric arc welding with continuous welding wire 30 flowed through by welding current, which nozzle 1 can be connected to a welding torch and comprises an electrically conductive contact tube 10 with a longitudinal through-hole 4,5,6 intended for passage of the welding wire 30 during welding from an inlet end 2 to an outlet end 3 in said longitudinal hole 4,5,6, and also comprises a spring element 20 intended to apply a force to the welding wire in a direction essentially transverse to the feed direction of the wire so as to press the welding wire against the inside of the contact tube. It is characteristic that the spring element has been mounted from the inlet end in the first portion of length of the longitudinal hole, which portion of length 4 has a greater cross-sectional area than a second portion of length 5. There are also claims for an associated spring element 20 and a welding torch with a contact nozzle as above mounted.

20 Claims, 1 Drawing Sheet

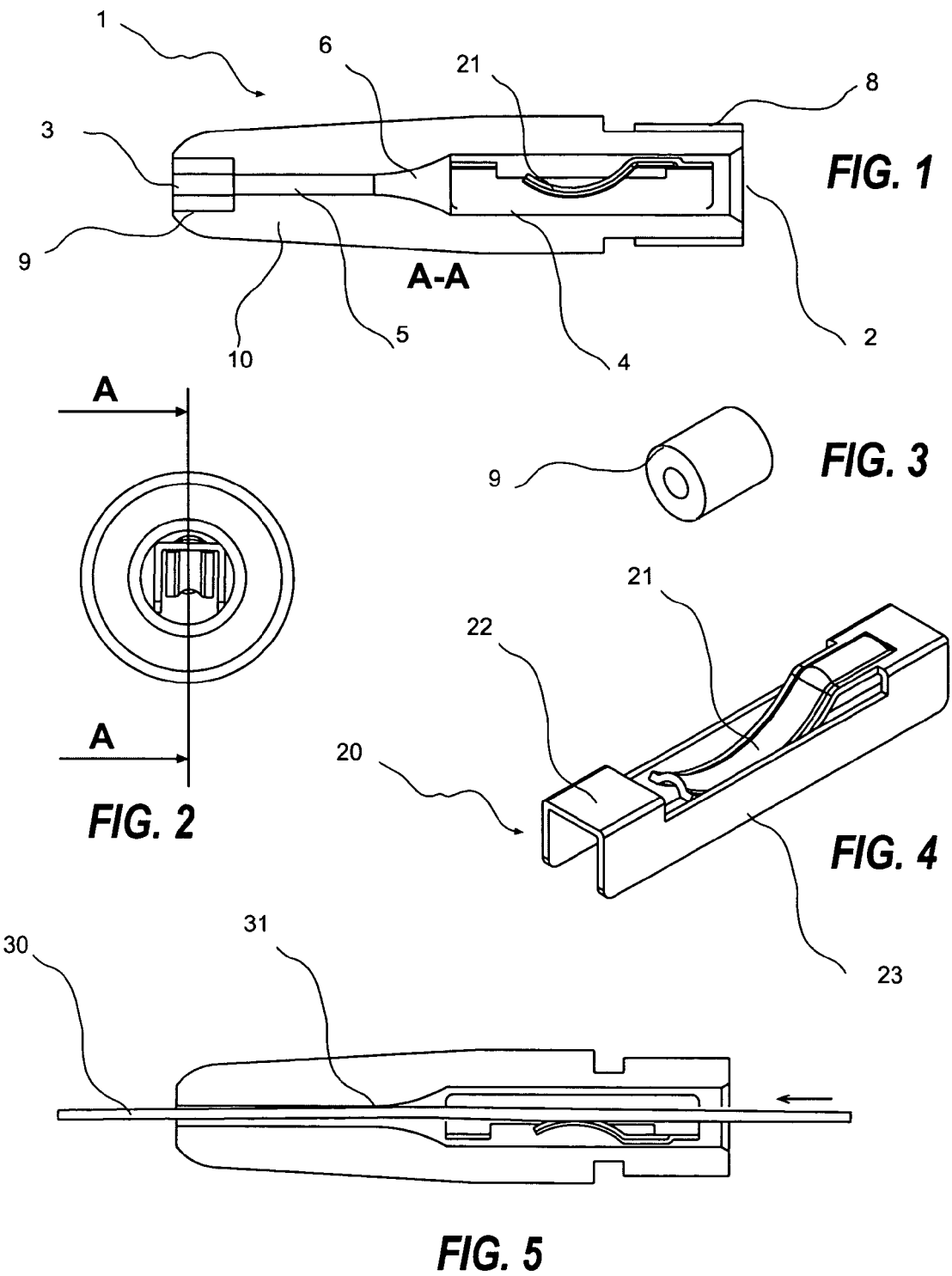

CONTACT NOZZLE FOR ELECTRIC ARC WELDING

BACKGROUND OF THE INVENTION

1. Technical Field

The present invention relates to a contact nozzle for electric arc welding and also a spring element for mounting in such a contact nozzle and also a welding torch with such a contact nozzle.

2. Background

In arc welding with mechanized feed of continuous welding wire, where the welding current flows through the welding wire, use is made of a contact nozzle, which can be mounted in a welding torch, with two main functions. Firstly, the contact nozzle is to guide mechanically the delivery of the welding wire from the welding torch so that the arc which is established during welding between the welding wire end and the welding workpiece has a repeatable and constant point of impact on the workpiece under otherwise unchanged conditions of the workpiece relative to the welding torch. Secondly, the contact nozzle is to bring about reliable and repetitive welding current transfer from the contact nozzle to the welding wire.

A contact nozzle of the kind mentioned above is normally made of pure copper or a copper alloy, or alternatively by powder metallurgy where copper constitutes an essential part. It is in the main designed as a tube with a through-hole for passage of the welding wire. One end is designed for connection to the welding torch, in most cases by means of a thread 8. The other end is designed so as to minimize the amount of welding spatter which becomes attached to the contact nozzle, for example by means of a slightly conical shape with a rounded end surface. The contact nozzle is often provided with a wrench grip so it is easier to take hold of and to detach from the welding torch.

Contact nozzles of the above kind are a consumable part in welding. In the case of automated welding, it often happens that the nozzle is exchanged, as a preventive measure, a number of times a day in order to avoid welding defects occurring during production. This involves a considerable cost in terms of both nozzles themselves and lost production time. The wear of the nozzles manifests itself in, for example, the output hole being enlarged and thus impairing the ability of the nozzle to guide the wire. This wear is caused partly by pure and simple mechanical wear as the wire passes through the nozzle but also by electric erosion in connection with spark formation when current transfer from contact nozzle to welding wire takes place. Another sign of a worn nozzle may be that the contact transfer of the welding current begins to a greater extent to migrate between different points in the nozzle, which results in varying welding characteristics by virtue of the current flowing through a shorter or longer part of the wire and thus the voltage available for the arc varying. In order to obtain a good and repeatable position of the contact transfer in the nozzle, it is of great importance that the radius of curvature of the welding wire, brought about by, for example, winding on a reel, is kept within predefined limits.

Various methods of increasing the life of the contact nozzles have been tried with varying success and at varying cost. One known method is to provide the contact nozzle with a lining made of harder material than the rest of the nozzle, preferably at the outlet end for the wire. This prevents enlargement of the outlet hole as a consequence of mechanical wear. If the lining is insulating as well, no electric erosion arises either, as a result of which the nozzle retains its ability to guide the welding wire for a considerably longer time. A disadvantage is that the contact transfer has a distinct tendency towards becoming more migratory along the length of the nozzle with the consequence that the welding process becomes more unstable.

Another method has been to stabilize the contact transfer with the aid of a spring element applied through a hole drilled radially from the side in the contact nozzle. This can provide a good and positionally stable current transfer. However, a disadvantage is the cost for both extra machining of the contact tube and mounting of the spring element.

SUMMARY OF THE INVENTION

One object of the invention is to provide a solution to the problem of the life of contact nozzles for electric arc welding with continuous welding wire flowed through by current being too short. Another object is to provide a contact nozzle which contributes to stabilizing the welding process. A further object is to provide a contact nozzle with a low manufacturing cost in spite of good wear characteristics and welding process characteristics. The invention achieves these objects in ways described herein.

Advantageous embodiments of the contact nozzles above are defined in the subclaims.

BRIEF DESCRIPTION OF THE DRAWINGS

FIG. 1 is a cross sectional view taken along the line A—A of FIG. 2 of a contact nozzle according to the invention FIG. 2 is a side view from the inlet side of a contact nozzle according to the invention.

FIG. 3 is a lining sleeve for mounting in the outlet hole of a contact nozzle FIG. 4 is an embodiment of a spring element for mounting, from the inlet side, in a first portion of the length of a longitudinal through-hole in a contact nozzle. The resilient contact tongue 21 has been bowl-shaped to fit the welding wire. There are distance elements 22, 23 to position the spring element both axially and radially in the hole.

FIG. 5 is cross sectional view of a contact nozzle according to the invention showing the spring element acting on a welding wire passing through the contact nozzle in the indicated direction

DESCRIPTION OF PREFERRED EMBODIMENTS

The contact nozzle 1 comprises a contact tube 10 made of electrically conductive material with a longitudinal through-hole 4,5,6 for making it possible for the welding wire 30 to pass through it during welding. The contact tube 10 has an inlet end 2 through which the welding wire 30 can pass into the contact tube and an outlet end 3 through which the welding wire 30 is intended to pass out in the direction towards the workpiece. The longitudinal hole 4,5,6 has a greater cross-sectional area at the inlet end 2 compared with in a subsequent portion of the length 5 of the hole. Furthermore, the contact nozzle comprises a spring element 20 mounted in the contact tube from its inlet end intended to act on the welding wire as it passes through the contact nozzle with a force directed transversely to the feed direction of the wire so as thus to press the welding wire against the inside of the contact tube and thus to provide a constant contact point 31 between the welding wire and the contact nozzle. This reduces electric spark formation inside the contact tube 10 as there is always a contact point 31. It follows that electric erosion does not contribute to the output hole being widened and the guiding function of the contact nozzle for the welding wire being jeopardized in the same way as in conventional nozzles.

During welding, the spring element presses the passing welding wire against one side of the inner side of the contact tube. On account of the curvature of the welding wire, the probable contact point between wire and contact tube is then either at the transition 6 from the smaller cross-sectional 5 area of the through-hole to the greater cross-sectional area 4 or at the edge of the contact tube at the outlet end 3 of the hole. There may be contact at both these points. An advantageous embodiment with a view to further stabilization of the welding process may therefore be to provide means for eliminating one of these contact points. Such means may be an electrically insulating lining sleeve 9 in the outlet hole or alternatively at the narrowing 6 of the through-hole in the wire feed direction. Such lining sleeves should be made of harder material than the rest of the contact tube in order to resist mechanical wear caused by passage of the wire. It is also possible to coat one of these surfaces with an electrically insulating layer. It is then advantageous if this layer has good characteristics as far as wear is concerned. A very simple measure may be quite simply to make the contact tube so short that the radius of curvature of the wire does not allow the wire to reach the hole edge at the outlet end.

For the same reason as above, it may be advantageous to manufacture the spring element 20 from electrically insulating material or at least from material with high resistivity, or alternatively the spring element can be coated with an electrically insulating layer. The same effect can be achieved if a thin insulating sleeve separates the contact tube from the spring element. By in this way preventing current from flowing through the spring element and thus heating it, the life of the spring may be expected to increase somewhat.

The invention is not limited to the embodiments described but can also comprise other embodiments within the scope thereof.

The invention claimed is:

1. A contact nozzle for electric arc welding with continuous welding wire flowed through by welding current, which nozzle can be connected to a welding torch and comprises
an electrically conductive contact tube with a longitudinal through-hole for passage of the welding wire during welding from an inlet end to an outlet end in said longitudinal hole, and a spring element arranged to apply a force to the welding wire in a direction essentially transverse to feed direction of the wire to press the welding wire against an inside of the contact tube, wherein
the longitudinal hole has a first portion of length with a certain cross-sectional area at the inlet end and a second portion of length with a smaller cross-sectional area than the first, the spring element has been mounted from the inlet end in the first portion of length of the longitudinal hole, and
additionally comprising means for preventing electric contact between the wire and said outlet end of said longitudinal through-hole.

2. The contact nozzle according to claim 1 wherein said means comprise an electrically insulating or high-resistance sleeve for preventing or reducing welding current transfer at said outlet end.

3. The contact nozzle according to claim 2 wherein said sleeve is made of harder material than the contact tube for increased wear-resistance.

4. A spring element being mounted in a contact nozzle according to claim 3, which comprises a resilient contact tongue arranged to, during use, apply the force to the passing welding wire essentially transversely to the feed direction of the wire and further comprising a distance element which after mounting in the contact tube gives the contact tongue its position in relation to the walls of the longitudinal hole.

5. A spring element being mounted in a contact nozzle according to claim 2, which comprises a resilient contact tongue arranged to, during use, apply the force to the passing welding wire essentially transversely to the feed direction of the wire and further comprising a distance element which, after mounting in the contact tube, gives the contact tongue its position in relation to the walls of the longitudinal hole.

6. The contact nozzle according to claim 1 wherein said means comprise insulating or high-resistance coating for preventing or reducing welding current transfer at said outlet end.

7. The contact nozzle according to claim 6 wherein said sleeve is made of harder material than the contact tube for increased wear-resistance.

8. A spring element being mounted in a contact nozzle according to claim 6, which comprises a resilient contact tongue arranged to, during use, apply the force to the passing welding wire essentially transversely to the feed direction of the wire and further comprising a distance element which after mounting in the contact tube gives the contact tongue its position in relation to the walls of the longitudinal hole.

9. A spring element being mounted in a contact nozzle according to claim 1, which comprises a resilient contact tongue arranged to, during use, apply the force to the passing welding wire essentially transversely to the feed direction of the wire and further comprising a distance element which, after mounting in the contact tube, gives the contact tongue its position in relation to the walls of the longitudinal hole.

10. The spring element according to claim 9 also comprising a second distance element which, after mounting in the contact tube, gives the contact tongue its position in relation to the transition between the first and second portion of length of the longitudinal hole.

11. The spring element according to claim 10 wherein the contact tongue has been structured in a bowl-shaped manner essentially according to diameter of the welding wire.

12. The spring element according to claim 9 wherein the contact tongue has been structured in a bowl-shaped manner essentially according to the diameter of the welding wire.

13. A welding torch, which comprises the contact nozzle according to claim 1.

14. A contact nozzle for electric arc welding with continuous welding wire flowed through by welding current, which nozzle can be connected to a welding torch and comprises
an electrically conductive contact tube with a longitudinal through-hole for passage of the welding wire during welding from an inlet end to an outlet end in said longitudinal hole, and
a spring element arranged to apply a force to the welding wire in a direction essentially transverse to feed direction of the wire to press the welding wire against an inside of the contact tube, wherein
the longitudinal hole has a first portion of length with a certain cross-sectional area at the inlet end and a second portion of length with a smaller cross-sectional area than the first,
the spring element has been mounted from the inlet end in the first portion of length of the longitudinal hole, and an electrically-insulating or high-resistance sleeve or coating extends to said outlet end of said longitudinal hole, for preventing or reducing welding current transfer at said outlet end.

15. A spring element being mounted in a contact nozzle according to claim 14, which comprises a resilient contact tongue arranged to, during use, apply the force to the passing welding wire essentially transversely to the feed direction of the wire and further comprising a distance element which after mounting in the contact tube gives the contact tongue its position in relation to the walls of the longitudinal hole.

16. The spring element according to claim 15, wherein the contact tongue has been structured in a bowl-shaped manner essentially according to diameter of the welding wire.

17. The spring element according to claim 15, also comprising a second distance element which, after mounting in the contact tube, gives the contact tongue its position in relation to the transition between the first and second portion of length of the longitudinal hole.

18. The spring element according to claim 17, wherein the contact tongue has been structured in a bowl-shaped manner essentially according to diameter of the welding wire.

19. A welding torch, which comprises the contact nozzle according to claim 14.

20. The contact nozzle of claim 14, wherein said sleeve or coating is made of harder material than the contact tube for increased wear-resistance.

* * * * *